Patented Sept. 15, 1942

2,295,608

UNITED STATES PATENT OFFICE 2,295,608

ALKYLATION CATALYST

Robert F. Ruthruff, Chicago, Ill.

No Drawing. Application December 4, 1939,
Serial No. 307,448

16 Claims. (Cl. 196—10)

This invention relates to an improved catalyst for the alkylation of organic compounds. More specifically, this invention relates to an improved catalyst for the alkylation of organic compounds by olefines. More particularly, this invention relates to an improved catalyst for the alkylation of hydrocarbons by olefines.

The alkylation of organic compounds is a reaction well known in the art. For example, the formation of p-tertiary butyl phenol by the alkylation of phenol with tertiary butanol, tertiary butyl chloride, isobutylene, or similar reagents in the presence of suitable catalysts is well known in the art. Similarly, certain hydrocarbons, such as benzene, toluene, naphthalene, and the like, are easily alkylated with alkyl halides, alcohols, olefines, or similar reagents in the presence of suitable catalysts, the aluminum halides or concentrated sulfuric acid being commonly used for the purpose.

More recently it has been found that under certain conditions, paraffinic hydrocarbons may be directly alkylated with olefines. For example, in my United States application, Serial No. 739,281, filed August 10, 1934, which has since matured into United States Patent 2,082,518, issued June 1, 1937, it is shown that when propylene-propane mixtures are passed over mercuric aluminum bromide or antimonous aluminum bromide at 750 pounds per square inch pressure and temperatures of 100–200° F. the liquid polymer yield is appreciably larger than the amount of propylene disappearing. Similarly, Ipatieff and Grosse (Journal of the American Chemical Society, volume 57, page 1616, (1935)) showed that isoparaffins are alkylated with olefines in the presence of boron fluoride promoted with nickel powder and water (or hydrogen fluoride). Subsequently, Ipatieff, Grosse, Pines, and Komarewsky (Ibid., volume 58, page 913, (1936)) showed that aluminum chloride is a more general catalyst, both normal and isoparaffins being alkylated with olefines in the presence of this agent. In this connection reference may be made to my United States application Serial No. 32,379, filed July 20, 1935, which has since matured into United States Patent 2,172,146, issued September 5, 1939, wherein it is shown that normal paraffins, in the presence of aluminum chloride, form isoparaffins. This isomerization may well precede the alkylation noted by these investigators. Other investigators have found that the alkylation of paraffin hydrocarbons with olefines is catalyzed by such materials as lithium aluminum chloride, sodium aluminum chloride, and various aluminum halide-hydrocarbon complexes. More recently, it has been found that ordinary concentrated sulfuric acid is an excellent agent for catalyzing the alkylation of isoparaffins with olefines. For further information reference may be had to the article by Birch, Dunstan, Fidler, Pim, and Tait in the Journal of the Institution of Petroleum Technologists, volume 24, page 303 (1938).

The alkylation of isoparaffins with olefines in the presence of concentrated sulfuric acid is now being practiced on the commercial scale. The utility of such a process is obvious. Previously, in the manufacture of high octane number gasoline, particularly high octane number gasoline for aviation purposes, it has been common practice to resort to catalytic polymerization of fractions containing hydrocarbons of four carbon atoms produced as a by-product in the cracking of petroleum fractions or by the catalytic dehydrogenation or thermal pyrolysis of the butane fraction from natural gas. Such fractions suitable for catalytic polymerization contain, in addition to isobutane and normal butane, isobutene, butene-1, and butene-2. During catalytic polymerization, the isobutene reacts rapidly, the normal butenes at a much slower rate, so that by proper control of conditions it is possible to obtain practically quantitative conversion of isobutene together with normal butene conversion varying from practically zero up to practically 100%. The resulting polymer consists largely of isomeric octenes and has an octane number of 80 to 82. This material is totally unsuited for use as an aviation fuel, due to the high unsaturate content, low octane number, and poor lead response. By hydrogenation, however, the isomeric octenes are converted to isomeric octanes. The hydrogenated product contains no unsaturates, has an octane number of from 90 to 98 or even higher, and exhibits an excellent lead response, and hence is well suited for use as an aviation fuel. The octane number of the hydrogenated product is largely a function of the amount of normal butenes converted; when normal butene conversion is low octane number is high and vice versa.

It will be obvious to those skilled in the art that alkylation offers many advantages over catalytic polymerization. By the alkylation of isobutane with a normal butene or isobutene, an isomeric octane is formed directly and accordingly the hydrogenation step, essential in the preparation of aviation fuels by catalytic polymerization, may be omitted. Furthermore, while in catalytic polymerization the maximum polymer yield can be no greater than the olefines present in the charge, in alkylation not only the olefines but also the isoparaffins react.

The alkylation of isoparaffins with olefines in the presence of sulfuric acid is a very simple process. A mixture of the two reactants, with the isoparaffin preferably in large excess, is contacted with concentrated sulfuric acid at low temperatures and at atmospheric or slightly elevated pressures. The reaction product is separated, the alkylate being sent to storage while the unreacted isoparaffins are mixed with fresh feed and recycled to the reaction zone. Ordinary room temperatures, or even lower temperatures, are commonly employed, for example temperatures of 70° F., or below, such as 55° F., 35° F., 0° F., or even lower.

Theoretically, in the alkylation of isoparaffins with olefines, the sulfuric acid catalyst should remain unchanged indefinitely. Actually, however, the sulfuric acid, due to side reactions and to other causes, deteriorates more or less rapidly and must be replaced. In commercial operations it is common practice to withdraw acid from the alkylation reactor at a constant predetermined rate and replace that withdrawn with new acid at the same rate. The acid withdrawn has been found to contain water, sulfonic acids, sulfonates, and similar products, so that while fresh 98% sulfuric acid is charged to the reactor, that withdrawn may contain only 80 to 90% sulfuric acid and from 5 to 15%, more or less, of carbon. In the formation of traces of sulfonic acids, sulfonates, and the like, traces of water are produced simultaneously, thereby diluting the acid. In addition, the feed commonly contains traces of water, which is also taken up by the acid. It has been found that for the alkylation reaction to proceed at a reasonable rate the acid concentration should preferably be 90% or more and in no case less than 80%. Accordingly, it is obvious that the alkylation acid must be restored to its initial strength from time to time by removal of water formed in by-reactions and taken up from the feed. Also, it has been found that used alkylation acid, after being restored to 98% strength, for example, by the addition of sulfur trioxide, is not nearly as effective in catalyzing the reaction as new 98% acid. In other words, the organic matter in used alkylation acid exhibits an inhibiting effect on the reaction so that to restore alkylation acid the organic matter as well as water must be removed.

The amount of acid that must be continuously removed from the reactor and replaced by fresh in order to maintain a high catalyst efficiency varies with the reaction temperature. When alkylating at high temperatures, for example 70° F. or more, it is preferable to remove 3 to 5 pounds or more of acid per gallon of alkylate formed. At lower temperatures, for example 35° F. or below, the acid may be removed at a rate of one pound per gallon of alkylate formed. While operating at low temperatures reduces appreciably the amount of acid that must be restored, even one pound of acid per gallon of alkylate is equivalent to over 50 tons of acid per day for a plant producing 2500 barrels of alkylate, so that acid restoration remains a real problem. In addition, when operating at low temperatures the rate of alkylation is low.

One object of this invention is to provide an improved sulfuric acid catalyst for the alkylation of organic compounds. Furthermore, an object of this invention is to provide a sulfuric acid catalyst for the alkylation of organic compounds that exhibits high activity at low temperatures. An additional object of this invention is to provide a sulfuric acid catalyst for the alkylation of organic compounds that is easily restored after partial or complete exhaustion. Other objects of this invention will become evident from the accompanying description.

In an attempt to increase the activity of sulfuric acid in the alkylation of isoparaffins with olefines at low temperatures, experiments were run in which the acid was promoted with small amounts of heavy metal salts, for example, small amounts of salts of mercury. The expected beneficial effect was observed and in addition it was found that in some cases this promoted acid, after complete or partial exhaustion, could easily be rendered carbon-free by simple heating. Prior to this observation it was necessary to remove carbon compounds from partially or completely exhausted acid by a very complicated procedure. This involved the dilution of the partially or completely exhausted acid with water until the acid content was in the neighborhood of 50%, followed by cooking at temperatures somewhat above the normal boiling point of water, for example 220 to 240° F., to hydrolyze and separate organic matter. By this process most of the organic matter forms a separate layer, which can be skimmed from the dilute acid. Further reduction in carbon content can be accomplished by autoclaving the resulting partially purified acid at temperatures some 100° F. above those employed in the cooking process and again removing the organic layer. The resulting dilute acid is concentrated as usual to say 93% strength and then is fortified to 98% strength by the addition of sulfur trioxide or oleum.

In distinction to unpromoted sulfuric acid, it was found that the sulfuric acid used in the experiments to be described, when promoted with a small amount of heavy metal salt, for example, mercuric sulfate, could, after partial or complete exhaustion, be easily rendered carbon-free by simple heating. On heating, the carbon compounds in the promoted acid were readily oxidized and eliminated as carbon dioxide, which was accompanied by sulfur dioxide. The resulting carbon-free acid could then be fortified with sulfur trioxide or oleum and reused. Further experimentation showed that various sulfuric acids, after promotion, differed greatly in their ability to oxidize carbon compounds contained therein. With the first acid tested, which was a commercial grade from an unknown source, the oxidation proceeded rapidly at low temperatures. On the other hand, some other samples of acid, after promotion, oxidized carbon compounds contained therein only with difficulty even at high temperatures. By the process of elimination it was demonstrated that the high activity of certain promoted sulfuric acids in oxidizing carbon compounds therein was due to the presence of traces of selenium compounds contained in said acids as impurities.

Experimentation showed that chemically pure sulfuric acid, when promoted with traces of a heavy metal salt, for example mercuric sulfate, was more active than pure sulfuric acid alone in catalyzing the alkylation of isoparaffins with olefines but was little if any more active than unpromoted acid in oxidizing carbon compounds contained in said acid. On the other hand, chemically pure sulfuric acid contaminated with a trace of a selenium compound was no better than the pure acid alone in promoting the isoparaffin-olefine reaction but was much more effective than the straight acid in oxidizing carbon compounds contained therein. Finally, chemically pure sulfuric acid containing both mercuric sulfate and a selenium compound was much more active than the straight acid in promoting the alkylation of isoparaffins with olefines and was ever so much more effective than the straight acid and considerably more effective than the unpromoted but selenium-contaminated acid in the oxidation of carbon compounds in said acid.

It is believed that in the presence of a heavy metal salt, for example, mercuric sulfate, sulfuric acid is a more effective alkylating agent due to the formation of labile olefine-heavy metal salt complexes, which results in the activation of the olefine molecules and thus increases their rate of reaction with the other component present. As far as oxidation of carbon compounds is concerned, it is believed that the selenium compound acts as an oxygen carrier between the sulfuric acid and the carbon compound, perhaps in accord with the following reactions:

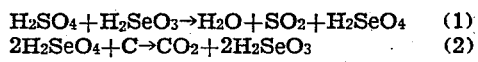

The presence of mercuric sulfate apparently promotes reaction (1). In its absence, no selenic acid can be detected in the reaction mixture while in its presence no selenious acid can be found, indicating that in the presence of mercuric sulfate reaction (1) proceeds instantaneously and completely in the direction shown. It is obvious that these speculations are theory only and in no way limit the scope of the instant invention.

To further aid in the understanding of my invention, the following example is given, but it is to be understood that this example is illustrative only and in no way limits the scope of the invention.

*Example.*—A mixture consisting of three volumes isobutane and one volume isobutene was continuously passed with agitation through 98% sulfuric acid containing 0.10 to 0.15% by weight of selenium (added as selenious acid) and 1.0 to 1.5% mercury (added as mercuric oxide). The temperature was maintained at 35° F. After equilibrium had been established, acid was continuously withdrawn from the reactor at a rate of one pound per gallon of alkylate formed, while restored 98% acid (from a source to be described hereinafter) was added to the reactor at the same rate. The acid withdrawn from the reactor was heated to a temperature in the neighborhood of 330° F. and was maintained at this temperature for 15 minutes, following which the remaining liquid was fortified with sufficient oleum to give one pound of 98% acid per pound of acid withdrawn from the reactor, and the thus restored acid was returned to the reactor. The gases evolved during the heating of the acid withdrawn from the reactor were treated in a manner well known in the art to convert the sulfur dioxide component into sulfur trioxide and this in turn into oleum. It is obvious that by this method of operation the loss of mercury and selenium is nil or practically so while the loss of sulfuric acid is extremely small.

In the above example the amounts of selenium and mercury given are indicative only but represent satisfactory proportions to employ under average conditions. It should be understood, however, that greater or lesser amounts of either or both of these elements may be employed as conditions dictate without departing from the spirit or scope of this invention. As will be evident to those skilled in the art, the exact form in which either or both of these elements is added is a matter of no moment. Either or both may be added as the element, as an -ous compound or an -ic compound, for regardless of the form in which added both agents will rapidly achieve the proper state of oxidation. Simply as a matter of convenience mercury is usually added as mercuric oxide, selenium as selenious acid. If desired, other heavy metal salts, for example, salts of copper and silver, may be used in addition to mercury.

While the present invention has been described largely in connection with the alkylation of isoparaffins with olefines, it is obvious that the invention is of much wider scope, being applicable to practically any alkylation reaction wherein an organic compound is alkylated with an olefine, or a material behaving as an olefine, in the presence of sulfuric acid. For example, the teachings of this invention have been applied with success to the alkylation of cyclic hydrocarbons, such as benzene, toluene, cyclohexane, napthalene, and the like, with olefines in the presence of sulfuric acid. Also, this invention has been applied with success to the alkylation of phenol with isobutylene or tertiary butyl chloride, in the presence of sulfuric acid. When an attempt is made to alkylate organic compounds with alcohols, ethers, and the like by following the teachings of this invention, no great advantages in acid restoration result, for in such cases the elimination of water in the reaction destroys the activity of the acid before any appreciable amount of organic contamination of the acid is observed. However, in such reactions the alkylation reaction itself is promoted.

The teachings of this invention have also been applied to reactions which are not truly alkylation, for example, to the conversion of olefines to alcohols. In this process, olefines are reacted with sulfuric acid to form alkyl sulfates, the reaction mixture is diluted with water, the alkyl sulfates are hydrolyzed to alcohols and separated from the dilute acid, which is then reconcentrated. In this reaction the mercury accelerates olefine absorption, while during reconcentration of the acid the combined action of mercury and selenium present accelerates the destruction of organic by-products by oxidation.

While the present invention has been described in connection with details or specific examples thereof, it is not intended that these shall be regarded as limitations upon the scope of this invention except insofar as included in the accompanying claims.

I claim:

1. In the alkylation of organic compounds, the improvement comprising employing a concentrated sulfuric acid catalyst containing a mercury compound and a selenium compound.

2. In the alkylation of organic compounds by olefins, the improvement comprising employing a concentrated sulfuric acid catalyst containing a mercury compound and a selenium compound.

3. In the alkylation of hydrocarbons, the improvement comprising employing a concentrated sulfuric acid catalyst containing a mercury compound and a selenium compound.

4. In the alkylation of hydrocarbons by olefines, the improvement comprising employing a concentrated sulfuric acid catalyst containing a mercury compound and a selenium compound.

5. In the alkylation of cyclic hydrocarbons, the improvement comprising employing a concentrated sulfuric acid catalyst containing a mercury compound and a selenium compound.

6. In the alkylation of cyclic hydrocarbons by olefines, the improvement comprising employing a concentrated sulfuric acid catalyst containing a mercury compound and a selenium compound.

7. In the alkylation of isoparaffins, the improvement comprising employing a concentrated sulfuric acid catalyst containing a mercury compound and a selenium compound.

8. In the alkylation of isoparaffins by olefines, the improvement comprising employing a concentrated sulfuric acid catalyst containing a mercury compound and a selenium compound.

9. A catalyst for the alkylation of organic compounds which comprises concentrated sulfuric acid containing a mercury compound and a selenium compound.

10. A catalyst for the alkylation of organic compounds with olefines which comprises concentrated sulfuric acid containing a mercury compound and a selenium compound.

11. A catalyst for the alkylation of hydrocarbons which comprises concentrated sulfuric acid containing a mercury compound and a selenium compound.

12. A catalyst for the alkylation of hydrocarbons with olefines which comprises concentrated sulfuric acid containing a mercury compound and a selenium compound.

13. A catalyst for the alkylation of cyclic hydrocarbons which comprises concentrated sulfuric acid containing a mercury compound and a selenium compound.

14. A catalyst for the alkylation of cyclic hydrocarbons with olefines which comprises concentrated sulfuric acid containing a mercury compound and a selenium compound.

15. A catalyst for the alkylation of isoparaffins which comprises concentrated sulfuric acid containing a mercury compound and a selenium compound.

16. A catalyst for the alkylation of isoparaffins with olefines which comprises concentrated sulfuric acid containing a mercury compound and a selenium compound.

ROBERT F. RUTHRUFF.